United States Patent Office  3,271,371
Patented Sept. 6, 1966

3,271,371
CURED DIEPOXY SULFONE AND POLYFUNC-
TIONAL AMINE COMPOSITIONS
Samuel W. Tinsley, South Charleston, Paul S. Starcher,
Charleston, and Charles W. McGary, Jr., and Charles
T. Patrick, Jr., South Charleston, W. Va., assignors to
Union Carbide Corporation, a corporation of New
York
No Drawing. Filed Mar. 31, 1960, Ser. No. 18,865
15 Claims. (Cl. 260—79.3)

This invention relates to diepoxy sulfone compositions. In various aspects, the invention relates to curable, polymerizable compositions comprising a diepoxy sulfone and a polyfunctional amine, to the thermosetting intermediate reaction products, and to the cured polymerized products resulting therefrom.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Little, if any, shrinkage occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel curable, partially cured, and cured compositions comprising a diepoxy sulfone and a polyfunctional amine. It is a further object of the invention to prepare novel curable compositions and partially cured compositions (thermosetting intermediate reaction products) comprising a diepoxy sulfone and a polyfunctional amine which compositions when dissolved in an inert normally-liquid organic medium are useful in the fields of coatings, laminates, adhesives, and the like. A still further object of the invention is to prepare novel thermosetting intermediate reaction solid products resulting from the partial reaction of a composition comprising a diepoxy sulfone and an active organic hardener which products are useful as molding powder compositions. Numerous other objects of the present invention will become apparent to those skilled in the art from a consideration of the disclosure.

The diepoxy sulfones contemplated as a component in the novel compositions of the invention can be characterized by the following formula:

(I)         R—SO$_2$—R wherein each R, individually can be (a) a vic-epoxyalkyl radical in which the vic-epoxy group is at least one carbon atom removed from the sulfone group, (b) a vic-epoxycycloalkyl radical in which the vic-epoxy group is contained in the cycloaliphatic ring and is at least one carbon atom removed from the sulfone group (c) a vic-epoxycycloalkylalkyl radical in which the vic-epoxy group is contained in the cycloaliphatic ring, (d) a 3-oxatricyclo[3.2.1.0$^{2,4}$]oct-)6-yl radical, or (e) a 3-oxatetracyclo[4.4.0.1$^{7,10}$.0$^{2,4}$]undec-8-yl radical. It should be noted at this time that the expression "vic-epoxy," as used herein including the appended claims, refers to the group

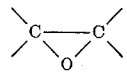

i.e., wherein the oxygen atom is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group from a part of the cycloaliphatic ring or nucleus. The cycloaliphatic ring preferably contains from 5 to 7 carbon atoms including the epoxy carbon atoms. In addition, the expression "lower alkyl," as used herein including the appended claims, refers to a monovalent saturated aliphatic hydrocarbon radical which contains from 1 to 4 carbon atoms. Moreover the "alkyl" moiety in the expression "vic-epoxycycloalkylalkyl" indicates that this moiety preferably contains up to 7 carbon atoms, is monovalently bonded to the "vic-epoxycycloalkyl" group, and also, is monovalently bonded to the sulfonyl group, i.e., —SO$_2$—group.

With reference to Formula I supra, illustrative R variables include, among others, 2,3-epoxypropyl, 2,3-epoxybutyl, 2-methyl-2,3-epoxypropyl, 2-methyl-2,3-epoxybutyl, 2,3-epoxypentyl, 2,3-epoxyhexyl, 2,3-epoxyoctyl, 4,5-epoxyhexyl 4,5-epoxypentyl, 5,6-epoxyoctyl, 10,11-epoxyundecyl, 9,10-epoxydecyl, 9,10-epoxyoctadecyl, 2,3-epoxycyclopentyl, 4 - methyl - 2,3 - epoxycyclopentyl, 4-isopropyl - 2,3 - epoxycyclopentyl, 3,4 - epoxycyclohexyl, 3 - ethyl - 3,4 - epoxycyclohexyl, 4 - methyl - 2,3 - epoxycyclohexyl, 6 - n - butyl - 3,4 - epoxycyclohexyl, 5-amyl - 3,4 - epoxycyclohexyl, 2,4 - diethyl - 3,4 - epoxycyclohexyl, 3,4 - epoxycycloheptyl, 4,5 - epoxycycloheptyl, 2 - ethyl - 3,4 - epoxycycloheptyl, 2,3 - epoxycyclopentylmethyl, 4 - methyl - 2,3 - epoxycyclopentylethyl, 3,4 - epoxycyclohexylmethyl, 2 - n - propyl - 3,4-epoxycyclohexylmethyl, 5 - ethyl - 3,4 - epoxycyclohexylpropyl, 3,4 - epoxycyclohexylamyl, 3,4 - epoxycycloheptylmethyl, 3,4-epoxycycloheptylethyl, and the like.

Illustrative subclasses of diepoxy sulfones include, for example, bis(vic-epoxyalkyl) sulfone, bis(vic-epoxycycloalkyl) sulfone, bis(lower alkyl substituted vic-epoxycycloalkyl) sulfone, bis(vic-epoxycycloalkylalkyl) sulfone, bis(lower alkyl substituted vic-epoxycycloalkylalkyl) sulfone, vic-epoxyalkyl vic-epoxycycloalkyl sulfone, vic-epoxyalkyl 3-oxatricyclo[3.2.-.0$^{2,4}$]oct - 6 - yl sulfone, vic-epoxycycloalkyl 3-oxatetracyclo[4.4.0.1$^{7,10}$.0$^{2,4}$]undec-8-yl sulfone, and the like.

Specific examples of diepoxy sulfones include, for instance, bis(2,3-epoxypropyl) sulfone,
bis(2-methyl-2,3-epoxypropyl) sulfone,
bis(2,3-epoxybutyl) sulfone,
bis(2,3-epoxypentyl) sulfone,
bis(2-ethyl-2,3-epoxyhexyl) sulfone, bis(10,11-epoxyundecyl) sulfone,
bis(9,10-epoxyoctadecyl) sulfone,
bis(2,3-epoxycyclopentyl) sulfone,
bis(lower alkyl substituted 2,3-epoxycyclopentyl) sulfone,
bis(2-ethyl-2,3-epoxycyclopentyl) sulfone,
bis(4-n-butyl-2,3-epoxycyclopentyl) sulfone,
bis(3,4-epoxycyclohexyl) sulfone,
bis(lower alkyl substituted 3,4-epoxycyclohexyl) sulfone,
bis(2-methyl-3,4-epoxycyclohexyl) sulfone,
bis(5-isopropyl-3,4-epoxycyclohexyl) sulfone,
bis(3,4-epoxycycloheptyl) sulfone,
bis(lower alkyl substituted 3,4-epoxycycloheptyl) sulfone,
bis(2,3-epoxycyclopentylalkyl) sulfone,
bis(2,3-epoxycyclopentylmethyl) sulfone,
bis(2,3-epoxycyclopentylpropyl) sulfone,
bis(3,4-epoxycyclohexylalkyl) sulfone,
bis(3,4-epoxycyclohexylmethyl) sulfone,
bis(3,4-epoxycyclohexylbutyl) sulfone,
bis(3,4-epoxycycloheptylalkyl) sulfone,
bis(3,4-epoxycycloheptylmethyl) sulfone,
bis(3-oxatricyclo[3.2.1.0$^{2,4}$]oct-6-yl) sulfone,
bis(3-oxatetracyclo[4.4.0.1$^{7,10}$.0$^{2,4}$]undec-8-yl) sulfone,
2,3-epoxypropyl 2,3-epoxycyclopentyl sulfone,
2-methyl-2,3-epoxypropyl 2,3-epoxycyclopentylmethyl sulfone,
10,11-epoxyoctadecyl 3,4-epoxycyclohexyl sulfone,
2-methyl-2,3-epoxyhexyl 3-oxatricyclo[3.2.1.0$^{2,4}$]oct-6-yl sulfone,
2,3-epoxycyclopentyl 3-oxatetracyclo[4.4.0.1$^{7,10}$.0$^{2,4}$] undec-8-yl sulfone,
2-methyl-3,4-epoxycyclohexyl 2,3-epoxycyclopentylethyl sulfone,
3,4-epoxypentyl 2-n-butyl-3,4-epoxycyclohexyl sulfone,
bis(lower alkyl substituted 3-oxatricyclo[3.2.1.0.$^{2,4}$]-oct-6-yl) sulfone,
bis(lower alkyl substituted 3-oxatetracyclo-[4.4.0.1$^{7,10}$.0$^{2,4}$]undec-8-yl) sulfone,
bis(dimethyl substituted 3-oxatetracyclo[4.4.0.1$^{7,10}$.0$^{2,4}$] undec-8-yl) sulfone,
and the like.

The diepoxy sulfones employed as a component in the novel compositions of the invention can be prepared by various routes. One route involves the reaction of, for example, bis(alkenyl) sulfone, bis(cycloalkenyl) sulfone, or bis(cycloalkenylalkyl) sulfone, with a solution of peracetic acid in ethyl acetate, at a temperature preferably in the range of from about 25° to 80° C., for a period of time sufficient to introduce oxirane oxygen at the site of both carbon to carbon double bonds of the sulfone reagent. Periodic analysis of samples of the reaction mixture to determine the quantity of peracetic acid consumed during the diepoxidation reaction can be readily performed by the operator by well-known procedures. Theoretically, to effect substantially complete diepoxidation of the di(olefinically unsaturated) sulfone reagent, at least a stoichiometric quantity of peracetic acid per carbon to carbon double bond of sulfone reagent should be employed. The ethyl acetate and acetic acid by-product can be recovered from the reaction product mixture, for example, by distillation under reduced pressure. If desired, the residue product can be subjected to fractional distillation, crystallization, and the like to obtain the diepoxy sulfone product in high purity. The diepoxy sulfones also can be prepared by the reaction of, for instance, bis(alkenyl) sulfide, bis(cycloalkenyl) sulfide, or bis(cycloalkenylalkyl) sulfide with at least 4 mols of peracetic acid per mol of sulfide reagent under the operative conditions noted previously. In this reaction, the sulfide moiety, i.e., —S—, is oxidized to the sulfonyl group, i.e., —SO$_2$—, and oxirane oxygen is introduced at the site of both carbon to carbon double bonds of the sulfide reagent. The Diels-Alder reaction provides a convenient method for preparing diunsaturated sulfones. For instance, a conjugated hydrocarbon diene, e.g., 1,3-butadiene, 1,3-hexadiene, dicyclopentadiene, alkyl substituted-dicyclopentadiene, etc., can be reacted with less than about 0.5 mol of divinyl sulfone per mol of diene, at elevated temperatures, to provide a bis(cycloalkyl) sulfone product. Diepoxidation of this product in the manner explained supra produces the corresponding diepoxy sulfone. A further route for preparing symmetrical and unsymmetrical diepoxy sulfones involves the reaction of haloalkene or halocycloalkene, e.g., 3-chloropropene, 3 - chlorocyclopentene, 3 - chloro-tricyclo-[4.3.0.1$^{2,5}$]dec-7-ene, 5-chloro-bicyclo[2.2.1]hept-2-ene, 4-chlorocyclohexene, etc., with the sodium salt of alkenyl mercaptan or cycloalkenyl mercaptan, i.e., RSNa wherein R can be alkenyl or cycloalkenyl and in which the RSNa preferably is contained in the corresponding mercaptan as a vehicle, at elevated temperatures, to produce the diunsaturated sulfide. The resulting diunsaturated sulfide product then can be reacted with at least 4 mols of peracetic acid per mole of said sulfide, in the manner illustrated previously to produce the corresponding diepoxy sulfone.

In the broad aspect, the invention is directed to novel curable, partially cured, and cured compositions comprising a diepoxy sulfone characterized by Formula I supra and a polyfunctional amine. By the term "polyfunctional amine," as used herein including the appended claims, is meant an organic amine having at least two active amino hydrogen atoms which can be on the same nitrogen atom or on different nitrogen atoms. The polyfunctional amines illustrated hereinafter are employed in a curing amount, that is, an amount which is sufficient to cause the curable system comprising diepoxy sulfone to become a thermosetting or thermoset resin in accordance with the teachings of the instant specification. The novel compositions can contain one diepoxy sulfone or a mixture of diepoxy sulfones as well as one polyfunctional amine or a mixture of polyfunctional amines.

Extremely useful hard, solid resins can be obtained by curing the curable compositions of the invention which contain such relative proportions of polyfunctional amine and diepoxy sulfone as provide from about 0.2 to about 5.0 amino hydrogen atoms of amine per epoxy group, i.e.

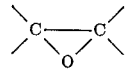

of sulfone. In this respect the above concentration of the components in the curable system represents a preferred aspect of the invention. In a highly preferred aspect, the curable systems contain the components in such relative amounts so as to provide from about 0.8 to about 1.5 amino hydrogen atoms of polyfunctional amine per epoxy group of diepoxy sulfone. Under the highly preferred aspect the resulting thermoset, cured resins are hard, tough, and infusible products. The curable compositions comprising, for example, diepoxy sulfone and a secondary aliphatic polyamine or aromatic polyamine, can be partially cured to form solid, partially polymerized resins, i.e., solid thermosetting intermediate reaction products, which can be pulverized or ground to make molding or casting compounds. Such molding or casting compounds can be stored without refrigeration for long periods of time, e.g., several weeks and longer, and subsequently be molded or otherwise shaped and fully cured by the application of heat. Curable compositions containing less than 0.2 and greater than 5.0 amino hydrogen atoms per epoxy group, in general, do not give hard, infusible products on curing. Curable compositions comprising diepoxy sulfone and an amine having but one active amino hydrogen atom per amine molecule generally do not form solid resins on curing, but rather, liquids of varying viscosities or tacky products are produced. Resins having properties which range from soft to tough and/or stiff to flexible can be produced by curing the compositions of the invention which contain from about 0.2 to about 5.0 amino hydrogen atoms of polyfunctional amine per epoxy group of diepoxy sulfone. Of course, in addition to the concentration of the diepoxy sulfone and polyfunctional amine employed, the nature of the sulfone and amine components also will effect the properties of the cured composition.

The curable compositions of the invention can be prepared by mixing the diepoxy sulfone(s) with the polyfunctional amine(s), preferably under agitation so as to obtain a homogeneous mixture. The order of addition of the components does not appear to be critical. When a solid or highly viscous diepoxy sulfone or active organic hardener is employed, heating is advantageous in facilitating the formation of a solution. In preparing homogeneous mixtures, it is advantageous to employ a temperature as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 10° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions form a uniform melt, whereas for coatings and the preparation of laminates, the use of solvents will allow the use of lower temperatures.

The time for effecting the partial cure of complete cure will be governed, to an extent, on several factors such as the particular diepoxy sulfone(s) employed, the particular polyfunctional amine(s) employed, the proportions of diepoxy sulfone and polyfunctional amine, the inclusion of a catalyst, the concentration of the catalyst, the temperature for effecting the cure, and other considerations. In general, the time for effecting the complete cure can vary from several minutes to several days, e.g., from 10 minutes to one week, depending upon the correlation of such factors as illustrated above.

If desired, catalysts can be incorporated into the curable compositions of the invention to increase the cure rate and/or reduce the gelation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.005 to 10 weight percent, and higher, preferably from about 0.01 to about 5 weight percent, based on the weight of the diepoxy sulfone(s) component, are advantageous in forming valuable thermoset resins from the curable compositions.

Catalysts which can be employed in the curable compositions include, for example, boron trifluoride, zinc chloride, stannic chloride, boron trifluoride-amine complex, boron trifluoride-piperidine complex, boron trifluoride-1,6-hexanediamine complex, boron trifluoride-monoethylamine complex, boron trifluoride-ether complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; and the alkali metal hydroxides, e.g., sodium hydroxide, potassium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

Among the polyfunctional amines contemplated providing that said amines contain at least two active amino hydrogen atoms which can be on the same nitrogen atoms of different nitrogen atoms, include the aliphatic amines, aromatic amines, aralkyl amines, cycloaliphatic amines, alkaryl amines, aliphatic polyamines including polyalkylene polyamines, amino-substituted monohydric aliphatic alcohols and monohydric phenols, polyamides, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, mesidine, benzylamine, phenethylamine, 1-naphthylamine, meta-, ortho-, and paraphenylenediamines, 1,4-naphthalenediamine, 3,4-toluenediamine and the like.

Illustrative cycloaliphatic amines include cyclopentylamine, cyclohexylamine, p-menthane-1,8-diamine and others.

Among the polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like.

The aliphatic polyamines contemplated in the present invention include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylenepentamine, dipropylenetriamine, and the like are particularly suitable.

The amino-substituted aliphatic monohydric alcohols and monohydric phenols suitable for use in the present invention are illustrated by 2-aminoethanol, 2-aminopropanol, 3-aminobutanol, 1,3-diamino-2-propanol, 2-aminophenol, 4-aminophenol, 2,3-diaminoxylenol, and the like.

Particularly useful polyfunctional amines are the monohydroxy polyalkylene polyamines which can be prepared by the addition reaction, for example, with one mole of polyalkylene polyamines preferably, ethylenediamine, propylenediamine, diethylenetriamine, dipropylenetriamine, triethylenetetramine, and the like, with less than one mole of ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include the monohydroxyalkyl-substituted alkylene polyamines such as N-hydroxyethylethylene diamine, N-hydroxypropyldiethylenetriamine, N-hydroxyethylpropylenediamine, N-hydroxyethyldipropylenetriamine, and the like.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyridine, and the like; dimethylurea, guanidine, p,p'-sulfonyldiamine, 3,9-bis(aminoethyl)spirobimetadioxane, hexahydrobenzamide, and others.

Other polyfunctional amines having a total of at least two active amino hydrogen atoms to the molecule can be advantageously employed in the epoxide compositions of this invention. For example, such polyfunctional amines as mixtures of p,p'-methylenedianiline and m-phenylenediamine, or other mixtures of two or more polyfunctional amines can be used.

Polyfunctional amines formed by the addition of amines to unsaturated compounds such as acrylonitrile, ethyl acrylate, propyl acrylate, butyl crotonate, and the like are also suitable.

In one embodiment is directed to curable and partially cured compositions (thermosetting intermediate reaction products that are viscous liquids or solids) comprising diepoxy sulfone and a polyfunctional amine, said compositions being dissolved in an inert normally-liquid organic medium such as xylene, methyl isobutyl ketone, butyl acetate, ethyl acetate, toluene, amyl acetate, tetrahydrofuran, and the like. The compositions dissolved in organic media such as the above can be used as, for example, surface coatings which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

As further embodiments, valuable thermosetting and thermoset resins can be prepared from curable compositions comprising a diepoxy sulfone(s), a polyfunctional amine(s), and other polyepoxides such as limonene dioxide, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol (3,4-epoxycyclohexanecarboxylate), bis(2,3-epoxycyclopentyl) ether, bis(3,4-epoxycyclohexylmethyl) pimelate, 1,1,1-trimethylolpropane tris(3,4-epoxycyclohexanecarboxylate), bis(2,3-epoxycyclohexyl) ether, 2,3-epoxypropyl 2,3-epoxycyclohexyl ether, the polyglycidyl polyethers of polyhydric phenols, and the like. The curing of these novel curable compositions has been disclosed supra.

In some instances, the diepoxy sulfone, e.g., bis(2-methyl-2,3-epoxypropyl) sulfone, is a mobile liquid thus making it admirably suitable as a reactive diluent when incorporated into various viscous curable systems containing a polyepoxide. In such cases, the diepoxy sulfone acts as a diluent thus reducing the viscosity of the curable system, and in addition, the diepoxy sulfone takes part in the curing reaction as a reactive component.

The thermoset cured resins of the invention can vary from soft and flexible to hard and rigid products, depending upon the proportion, the functionality, and the chain length of the polyfunctional amine(s) employed. These resins are insoluble in many of the organic solvents. The hard, infusible, rigid, thermoset resins can be machined to desired shapes and configurations, and they can be polished to provide appealing finishes. The novel compositions, as indicated throughout the specification, are highly useful and valuable in fields such as the coatings, laminating, molding, encapsulation, etc., arts.

In the following illustrative examples Barcol hardness values were determined by the use of Barcol Impressor GYZJ–934–1 at a temperature of about 25° C. Unless otherwise indicated, the examination or description of the resins were conducted at room temperature, i.e., about 24° C.

*Example 1*

Bis(3,4-epoxycyclohexyl) sulfone (1.29 grams) and 1,6-hexanediamine (0.29 gram) were admixed in amounts so as to provide 1.0 amino hydrogen of said 1,6-hexanediamine per epoxy group of said sulfone. The resulting admixture then was heated to 120° C. for 5 hours plus an additional 10 hours at 160° C. Gelation of the admixture was observed after 3.3 hours at 120° C. There was obtained a hard resin.

In an analogous manner as above, when bis(2-methyl-2,3-epoxypropyl) sulfone is admixed with dipropylenetriamine in amounts so as to provide 2.0 amino hydrogen atoms of said amine per epoxy group of said sulfone, followed by curing the resulting admixture under essentially similar operative conditions, there is obtained a hard, infusible resin.

*Example 2*

Bis(3,4-epoxycyclohexyl) sulfone (1.29 grams) and xylylenediamine (0.34 gram) were admixed in amounts so as to provide 1.0 amino hydrogen atom of said amine per epoxy groups of said sulfone. The resulting admixture then was heated to 120° C. for 5 hours plus an additional 10 hours at 160° C. Gelation of the admixture was observed after 0.1 hour at 120° C. There was obtained a hard, tough resin which possessed a Barcol hardness value of 40.

In an analogous manner as above, when 2,3-epoxypropyl 3-oxatetracyclo[4.4.0.1$^{7,10}$.0$^{2,4}$]undec-8-yl sulfone is admixed with pentylenediamine in amounts so as to provide 1.0 amino hydrogen atom of said amine per epoxy group of said sulfone, followed by curing the resulting admixture under essentially similar operative conditions, there is obtained a hard, infusible resin.

*Example 3*

Bis(3,4-epoxycyclohexyl) sulfone (1.29 grams) and aniline (0.47 gram) were admixed in amounts so as to provide 1.0 amino hydrogen atom of said aniline per epoxy group of said sulfone. The resulting admixture then was heated to 120° C. for 5 hours plus an additional 12 hours at 120° C. There was obtained a hard, tough resin.

In an analogous manner as above, when bis(3-oxatricyclo[3.2.1.0$^{2,4}$]oct-6-yl sulfone is admixed with isobutylamine in amounts so as to provide 1.5 amino hydrogen atoms of said isobutylamine per epoxy group of said sulfone, followed by curing the resulting admixture under essentially similar operative conditions, there is obtained a hard, tough resin.

*Example 4*

Bis(3,4-epoxycyclohexyl) sulfone (1.29 grams) and 2-ethylhexylamine (0.65 gram) were admixed in amounts so as to provide 1.0 amino hydrogen atom of said amine per epoxy group of said sulfone. The resulting admixture then was heated to 120° C. for 5 hours plus an additional 13 hours at 160° C. There was obtained a hard resin.

In an analogous manner as above, when bis(2,3-epoxycyclopentylmethyl) sulfone is admixed with benzylamine in amounts so as to provide 1.5 amino hydrogen atoms of said amine per epoxy group of said sulfone, followed by curing the resulting admixture under essentially similar operative conditions, there is obtained a hard resin.

*Example 5*

Bis(2-methyl-2,3-epoxypropyl) sulfone (23.6 grams) and 4,4'-methylenedianiline (11.4 grams) were admixed in a vessel and heated until a homogeneous liquid solution was obtained. This liquid solution was poured into a bar mold and heated to 50° C. for 2.5 hours after which period of time gelation occurred. The gelled admixture subsequently was heated to 80° C. for 1.5 hours, to 100° C. for 1.2 hours, to 120° C. for 0.75 hour, and to 160° C. for 6 hours. There was obtained a hard, tough resin which possessed a Barcol hardness value of 15 and a Heat Distortion Point value of 123° C.

In an analogous manner as above, when 4,5-epoxypentyl 3 - oxatetracyclo[4.4.0.1$^{7,10}$.0$^{2,4}$]undec - 8 - yl sulfone is admixed with 1-naphthylamine in amounts so as to provide 1.2 amino hydrogen atoms of said amine per epoxy group of said sulfone, followed by curing the resulting admixture under essentially similar operative conditions, there is obtained a hard resin.

*Examples 6–19*

Bis(2-methyl-2,3-epoxypropyl) sulfone (1.06 grams) and 4,4'-methylenedianiline were admixed in various proportions. The resulting admixtures then were heated to 80° C. for 5 hours, to 100° C. for 2 hours, and to 160° C. for 6 hours. The pertinent data and results are set forth in Table I below.

TABLE I

| Example Number | 4,4'-Methylenedianiline Weight in Grams | Amino Hydrogens/ Epoxy Ratio | Gel Time, Minutes, 80° C. | Resin Description |
|---|---|---|---|---|
| 6 | 0.10 | 0.2 | | Hard. |
| 7 | 0.15 | 0.3 | | Hard. |
| 8 | 0.20 | 0.4 | 120 | Hard. |
| 9 | 0.25 | 0.5 | 120 | Hard. |
| 10 | 0.40 | 0.8 | 23 | Tough Barcol 52. |
| 11 | 0.50 | 1.0 | 2 | Tough Barcol 52. |
| 12 | 0.60 | 1.2 | 10 | Tough Barcol 50. |
| 13 | 0.75 | 1.5 | 4 | Tough Barcol 40. |
| 14 | 0.88 | 1.75 | 1 | Hard. |
| 15 | 1.00 | 2.0 | 17 | Hard. |
| 16 | 1.25 | 2.5 | 16 | Hard. |
| 17 | 1.50 | 3.0 | 15 | Hard. |
| 18 | 1.75 | 3.5 | 25 | Hard. |
| 19 | 2.00 | 4.0 | 40 | Hard. |

*Example 20*

Bis(2-methyl-2,3-epoxypropyl) sulfone (1.06 grams) and 1,6-hexanediamine (0.29 gram) were admixed in a vessel and heated to 50° C. for 8 hours, to 120° C. for 9 hours, and to 160° C. for 6 hours. There was obtained a hard resin.

In an analogous manner as above, when bis(9,10-octadecyl) sulfone is admixed with cyclohexylamine in amounts so as to provide 1.5 amino hydrogen atoms of said amine per epoxy group of said sulfone, followed by curing the resulting admixture under essentially similar operative conditions, there is obtained a solid, flexible resin.

*Example 21*

Bis(2-methyl-2,3-epoxypropyl) sulfone (1.06 grams) and xylylenediamine (0.34 gram) were admixed in a vessel and heated to 50° C. for 8 hours, to 120° C. for 9 hours, and to 160° C. for 6 hours. There was obtained a hard resin.

In an analogous manner as above, when bis(4-methyl-2,3-epoxycyclopentyl) sulfone is admixed with triethylenetetramine in amounts so as to provide 2.0 amino hydrogens of said amine per epoxy group of said sulfone, followed by curing the resulting admixture under essentially similar operative conditions, there is obtained a hard resin.

*Example 22*

Bis (2-methyl-2,3-epoxypropyl) sulfone (1.06 grams) and aniline (0.47 gram) were admixed in a vessel and heated to 50° C. for 8 hours, to 120° C. for 9 hours, and to 160° C. for 6 hours. There was obtained a hard resin.

In an analogous manner as above, when 1-methyl-2,3-epoxypropyl 3-oxatetracyclo[4.4.0.1$^{7,10}$.0$^{2,4}$]oct-6-yl sulfone is admixed with 1,4-naphthalenediamine in amounts so as to provide 1.0 amino hydrogen atom of said amine per epoxy group of said sulfone, followed by curing the resulting admixture under essentially similar operative conditions, there is obtained a hard resin.

*Example 23*

An isomeric mixture of bis(2,3-, and 4-methyl-3,4-epoxycyclohexyl) sulfone (1.43 grams) and diethylenediamine (0.27 gram) were admixed in a vessel and heated to 120° C. for 20 hours plus an additional 6 hours at 160° C. There was obtained a hard resin.

*Example 24*

Bis(3-oxatricyclo[3.2.1.0$^{2,4}$]oct - 6 - yl sulfone (1.43 grams) and diethylenetriamine (0.27 gram) were admixed and heated to 120° C. for 25 hours plus an additional 6 hours at 160° C. There was obtained a hard resin.

Although the invention has been illustrated by the preceding examples, the invention is not to be construed as limited to the materials employed in the above-exemplary examples, but rather, the invention encompasses the generic area as hereinbefore disclosed. Various modifications and embodiments of the invention can be made without departing from the spirit and scope thereof.

What is claimed is:

1. A polymerizable composition comprising a diepoxy sulfone having the formula

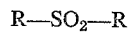

R—SO$_2$—R wherein each R, individually, is selected from the group consisting of (a) vic-epoxyalkyl radical in which the vic-epoxy group is at least one carbon atom removed from the sulfonyl group, (b) a vic-epoxycycloalkyl radical which has from 5 to 7 carbon atoms in the cycloalkyl ring and in which the vic-epoxy group is at least one carbon atom removed from the sulfonyl group, (c) a vic-epoxycycloalkylalkyl radical which has from 5 to 7 carbon atoms in the cycloalkyl ring and in which the alkyl moiety contains up to 7 carbon atoms, (d) a 3-oxatricyclo[3.2.1.0$^{2,4}$]-oct-6-yl radical, and (e) a 3-oxatetracyclo-[4.4.0.1$^{7,10}$.0$^{2,4}$]undec-8-yl radical; and from about 0.2 to about 5.0 amino hydrogen atoms of a polyfunctional amine per epoxy group of said diepoxy sulfone, said polyfunctional amine having at least two active amino hydrogen atoms in the molecule.

2. A cured, thermoset resin resulting from the reaction of composition defined in claim 1.

3. The composition of claim 1 wherein said polyfunctional amine is employed in an amount so as to provide from about 0.8 to about 1.5 amino hydrogen atoms per epoxy group of said diepoxy sulfone, said polyfunctional amine having at least two active amino hydrogen atoms in the molecule.

4. The cured, thermoset resin resulting from the reaction of the composition defined in claim 3.

5. A polymerizable composition comprising bis(vic-epoxyalkyl) sulfone wherein the vic-epoxy group is at least one carbon atom removed from the sulfonyl group, and a polyfunctional amine in such relative amounts as to provide from about 0.2 to about 5.0 amino hydrogen atoms of said amine per epoxy group of said sulfone, said polyfunctional amine having at least two active amino hydrogen atoms in the molecule.

6. The cured, thermoset resin resulting from the reaction of the composition defined in claim 5.

7. A polymerizable composition comprising a bis(vic-epoxycycloalkyl) sulfone wherein the epoxy group is at least one carbon atom removed from the sulfonyl group, and a polyfunctional amine in such relative amounts as to provide from about 0.2 to about 5.0 amino hydrogen atoms of said amine per epoxy group of said sulfone, said polyfunctional amine having at least two active amino hydrogen atoms in the molecule.

8. The cured, thermoset resin resulting from the reaction of the composition defined in claim 7.

9. A polymerizable composition comprising bis(3-oxatricyclo[3.2.1.0$^{2,4}$]oct-6-yl)sulfone, and a polyfunctional amine in such relative amounts as to provide from about 0.2 to about 5.0 amino hydrogen atoms of said amine per epoxy group of said sulfone, said polyfunctional amine having at least two active amino hydrogen atoms in the molecule.

10. The cured, thermoset resin resulting from the reaction of the composition defined in claim 9.

11. A polymerizable composition comprising bis(3-oxatetracyclo[4.4.0.1$^{7,10}$.0$^{2,4}$]undec-8-yl)sulfone, and a polyfunctional amine in such relative amounts as to provide from about 0.2 to 5.0 amino hydrogen atoms of said amine per epoxy group of said sulfone, said polyfunctional amine having at least two active amino hydrogen atoms in the molecule.

12. The cured, thermoset resin resulting from the reaction of the composition defined in claim 11.

13. A resin prepared from a polymerizable composition comprising bis(vic-epoxycyclohexyl) sulfone wherein the vic-epoxy group is at least one carbon atom removed from the sulfonyl group, and xylylenediamine in such relative amounts so as to provide from about 0.2 to about 5.0 amino hydrogen atoms of said amine per epoxy group of said sulfone, said polyfunctional amine having at least two active amino hydrogen atoms in the molecule.

14. A resin prepared from a polymerizable composition comprising bis(2-methyl-2,3-epoxypropyl) sulfone and 4,4'-methylenedianiline in such relative amounts so as to provide from about 0.2 to about 5.0 amino hydrogen atoms of said amine per epoxy group of said sulfone, said polyfunctional amine having at least two active amino hydrogen atoms in the molecule.

15. A resin prepared from a polymerizable composition comprising bis(3 - oxatetracyclo[3.2.1.0$^{2,4}$]oct-6-yl) sulfone and diethylenediamine in such relative amounts so as to provide from about 0.2 to about 5.0 amino hydrogen atoms of said amine per epoxy group of said sulfone, said polyfunctional amine having at least two active amino hydrogen atoms in the molecule.

References Cited by the Examiner

UNITED STATES PATENTS

| | | | |
|---|---|---|---|
| 2,765,322 | 10/1956 | Beavers | 260—49 |
| 2,809,184 | 10/1957 | Langer | 260—47 |

OTHER REFERENCES

Lee et al., Epoxy Resins, July 31, 1957, McGraw-Hill Book Co., Inc., New York, pp. 10–21, 41–44 and 51–52.

JOSEPH L. SCHOFER, *Primary Examiner.*

MILTON STERMAN, PHILIP E. MANGAN,
*Examiners.*

H. D. ANDERSON, A. D. RICCI, *Assistant Examiners.*